(12) United States Patent
Rekimoto

(10) Patent No.: US 10,816,814 B2
(45) Date of Patent: Oct. 27, 2020

(54) IMAGING DEVICE

(71) Applicant: SONY CORPORATION, Tokyo (JP)

(72) Inventor: Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/345,373

(22) PCT Filed: Oct. 6, 2017

(86) PCT No.: PCT/JP2017/036492
§ 371 (c)(1),
(2) Date: Apr. 26, 2019

(87) PCT Pub. No.: WO2018/105223
PCT Pub. Date: Jun. 14, 2018

(65) Prior Publication Data
US 2019/0258066 A1    Aug. 22, 2019

(30) Foreign Application Priority Data

Dec. 8, 2016    (JP) ................ 2016-238599

(51) Int. Cl.
| | | |
|---|---|---|
| *G02B 27/02* | (2006.01) | |
| *G03B 35/18* | (2006.01) | |
| *H04N 5/225* | (2006.01) | |
| *H04N 5/64* | (2006.01) | |
| *H04N 7/14* | (2006.01) | |

(52) U.S. Cl.
CPC .......... *G02B 27/028* (2013.01); *G02B 27/02* (2013.01); *G02B 27/022* (2013.01); *G03B 35/18* (2013.01); *H04N 5/225* (2013.01); *H04N 5/2252* (2013.01); *H04N 5/64* (2013.01); *H04N 7/14* (2013.01); *G02B 27/021* (2013.01)

(58) Field of Classification Search
None
See application file for complete search history.

(56) References Cited

U.S. PATENT DOCUMENTS

2017/0038834 A1* 2/2017 Wilson .................... G06T 7/215
2017/0140223 A1* 5/2017 Wilson .................... H04N 5/33

FOREIGN PATENT DOCUMENTS

| JP | H11-096366 A | 4/1999 |
|---|---|---|
| JP | 2000-004395 A | 1/2000 |
| JP | 2000-270584 A | 9/2000 |
| JP | 2003-230539 A | 8/2003 |
| JP | 2014-021272 A | 2/2014 |
| JP | 2016-158794 A | 9/2016 |
| WO | WO 2015/198477 A1 | 12/2015 |
| WO | WO 2015/198502 A1 | 12/2015 |

* cited by examiner

*Primary Examiner* — Nicholas J Lee
(74) *Attorney, Agent, or Firm* — Paratus Law Group, PLLC

(57) ABSTRACT

There is provided an imaging device, the imaging device including: a support structure configured to be mountable on a head of a user; an optical filter having a reflection surface that reflects predetermined light having a predetermined wavelength band and allows visible light to pass; and at least one first imaging unit configured to acquire a first image including at least a part of a face of the user on the basis of the predetermined light reflected by the reflection surface.

15 Claims, 12 Drawing Sheets

FIG. 10
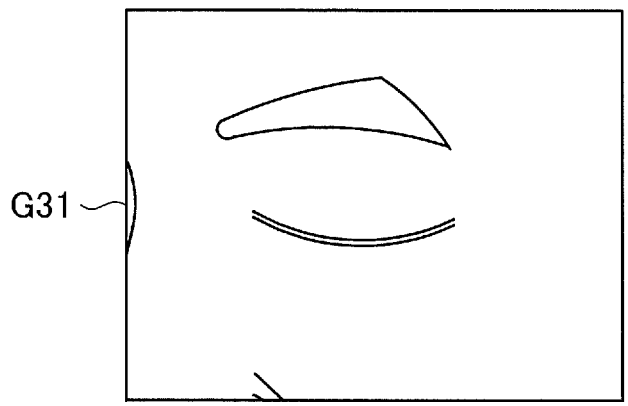
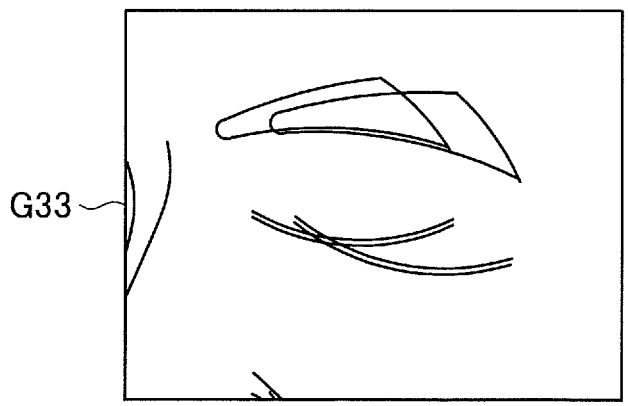

IMAGING DEVICE

CROSS REFERENCE TO PRIOR APPLICATION

This application is a National Stage Patent Application of PCT International Patent Application No. PCT/JP2017/036492 (filed on Oct. 6, 2017) under 35 U.S.C. § 371, which claims priority to Japanese Patent Application No. 2016-238599 (filed on Dec. 8, 2016), which are all hereby incorporated by reference in their entirety.

TECHNICAL FIELD

The present disclosure relates to an imaging device.

BACKGROUND ART

In recent years, head-mounted devices, such as a head-mounted display (HMD), have been used in a virtual reality (VR) system or the like. For example, in an application (e.g. television conference) in which users wearing HMDs communicate with each other in a VR space, the HMDs shield at least a part of faces of the users (wearers) and may therefore be a factor that obstructs face-to-face communication.

For example, Patent Literature 1 cited below discloses a technology of combining an image signal from a main video camera that captures an image of a subject wearing an HMD with an image signal from an auxiliary video camera attached to the HMD in order to capture an image of a part shielded by the HMD and reproducing an image of the subject. Further, Patent Literature 2 cited below discloses a technology of illuminating a face of a user wearing an HMD with the use of infrared illumination and combining images of the face of the user captured by cameras having different wavelength ranges to respond, thereby obtaining an image of the user.

CITATION LIST

Patent Literature

Patent Literature 1: JP 2000-43954
Patent Literature 2: JP 2000-270584A

DISCLOSURE OF INVENTION

Technical Problem

However, in a case where the above-mentioned technologies are applied to recent head-mounted devices that have been reduced in size, it is difficult to sufficiently secure a distance between a subject (a face of a user) and a camera, and therefore an angle of view (image-capturing range) may be reduced. Meanwhile, in a case where the distance between the subject and the camera is sufficiently secured in order to capture an image of the subject at a suitable angle of view, a device or a system may be increased in size.

In view of this, in a head-mounted device, there has been desired capturing an image of a face of a user at a suitable angle of view and also restraining an increase in size of the device.

Solution to Problem

According to the present disclosure, there is provided an imaging device including: a support structure configured to be mountable on a head of a user; an optical filter having a reflection surface that reflects predetermined light having a predetermined wavelength band and allows visible light to pass; and at least one first imaging unit configured to acquire a first image including at least a part of a face of the user on the basis of the predetermined light reflected by the reflection surface.

According to the present disclosure, the optical filter allows visible light to pass, and therefore the user can observe visible light. Further, the first imaging unit acquires an image on the basis of predetermined light reflected by the optical filter, and therefore it is possible to further increase a distance from the first imaging unit to a subject even in a case where a housing is small.

Advantageous Effects of Invention

As described above, according to the present disclosure, it is possible to capture an image of a face of a user at a suitable angle of view and also restrain an increase in size of a device.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is an explanatory diagram for describing an example of calibration.

MODE(S) FOR CARRYING OUT THE INVENTION

Figure 1:
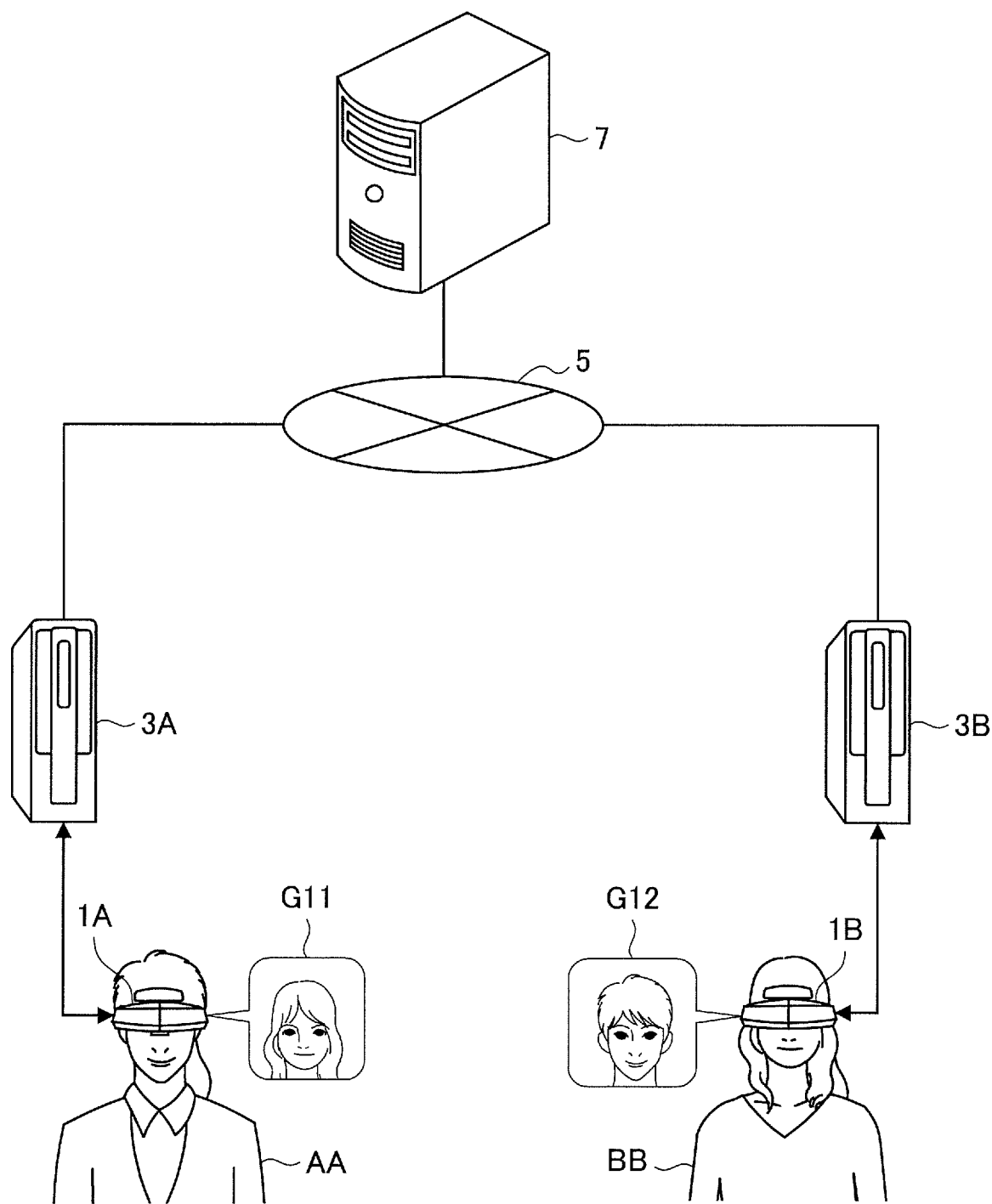
FIG. 1 is an explanatory diagram illustrating an example of a configuration of a VR system including an imaging device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that description will be provided in the following order.

<<1. Overview>>
<<2. Configuration>>
    <2-1. External configuration of imaging device>
    <2-2. Functional configuration of imaging device>
    <2-3. Functional configuration of information processing device>
<<3. Operation>>
<<4. Modification examples>>
    <4-1. Modification example 1>
    <4-2. Modification example 2>
    <4-3. Modification example 3>
<<5. Hardware configuration example>>
<<6. Conclusion>>

1. Overview

First, an overview of an embodiment according to the present disclosure will be described with reference to the drawings. FIG. 1 is an explanatory diagram illustrating an example of a configuration of a VR system including an imaging device according to the embodiment of the present disclosure.

As illustrated in FIG. 1, a VR system 9 according to the embodiment of the present disclosure is an information processing system including imaging devices 1 (1A, 1B), information processing, devices 3 (3A, 3B), a communication network 5, and a server 7. Further, the VR system 9 according to the present embodiment provides, to users, an application in which remote users virtually perform face-to-face communication in a VR space, for example.

Each imaging device 1 is a device to be mounted on a head of a user, and, for example, the imaging device 1 may be a non-transmissive head-mounted display (HMD) as illustrated in FIG. 1. In the example illustrated in FIG. 1, a user AA wears the imaging device 1A and a user BB wears the imaging device 1B.

Each information processing device 3 controls the imaging device 1 and causes the imaging device 1 to display, for example, an image regarding an application provided by the server 7. Further, the information processing device 3 may generate an image that the information processing device 3 causes the imaging device 1 to display on the basis of information provided from the imaging device 1 or may provide information to the server 7 on the basis of information provided from the imaging device 1. The imaging device 1 and the information processing device 3 may be connected in a wired manner or may be wirelessly connected. Note that a function of the information processing device 3 may be included in the imaging device 1.

The communication network 5 is a wired or wireless transmission path of information transmitted from devices connected to the communication network 5. For example, the communication network 5 may encompass public networks such as the Internet, a telephone network, and a satellite communication network, various kinds of local area networks (LANs) including Ethernet (registered trademark), a wide area network (WAN), and the like. Further, the communication network 5 may encompass dedicated networks such as Internet Protocol-Virtual Private Network (IP-VPN). As illustrated in FIG. 1, the information processing devices 3 and the server 7 are connected to each other via the communication network 5.

The server 7 performs processing regarding an application provided by the VR system 9. For example, the server 7 provides, to the information processing devices 3, an image regarding an application in which remote users virtually perform face-to-face communication in the VR space or information for generating the image.

Herein, as illustrated in FIG. 1, a part of a face (e.g. a part of and around eyes) of the user AA wearing the imaging device 1A is shielded by the imaging device 1A. Therefore, even if an image of the user AA is captured by an external camera or the like, an image of the user AA whose part of the face is shielded by the imaging device 1A is acquired. In a case where the user AA communicates with the user BB in the VR space by using the image, it may be difficult for the user BB to sufficiently grasp expression of the user AA.

In view of this, the imaging device 1 according to the present embodiment acquires an image including a part of a face of a user, the part being shielded by the imaging device 1, and therefore enables another user facing the user to grasp expression, thereby achieving smooth communication.

For example, the imaging device 1A illustrated in FIG. 1 acquires an image including a part of the face of the user AA, the part being shielded by the imaging device 1A, and provides the image to the information processing device 3A. The information processing device 3A combines, for example, a 3D (three-dimensional) model of the user AA acquired in advance with the image provided from the imaging device 1A, reproduces a 3D model of the user AA who is not wearing the imaging device 1A, and provides the 3D model to the server 7. Further, the server 7 provides, for example, information regarding the VR space and the 3D model of the user AA to the information processing device 3B.

The information processing device 3B controls display of the imaging device 1B on the basis of the information regarding the VR space and the 3D model of the user AA. For example, the information processing device 3B places, for example, the 3D model of the user AA in the VR space and performs rendering, thereby causing the imaging device 1B to display an image G12 including the face of the user AA who is not wearing the imaging device 1A as illustrated FIG. 1. Similarly, information processing is performed by the information processing device 3B, the server 7, and the information processing device 3A on the basis of an image acquired by the imaging device 1B, and therefore an image G11 including a face of the user BB who is not wearing the imaging device 1B is displayed on the imaging device 1A.

With this configuration, a user can perform communication in the VR space while grasping expression of another user, and therefore smoother communication can be achieved. Further, the imaging device 1 according to the present embodiment includes an optical filter that reflects predetermined light (a beam of light) having a predetermined wavelength band an imaging unit that acquires an image including a part of a face of a user on the basis of the predetermined light, and therefore it is possible to capture an image of the part of the face of the user at a suitable angle of view and also restrain an increase in size of the device.

Hereinafter, a configuration and operation according to the present embodiment having such an effect will be successively described in detail.

2. Configuration

Hereinabove, the overview of the present embodiment has been described. Next, a configuration according to the present embodiment will be described. Hereinafter, first, an example of an external configuration of the imaging device 1 according to the present embodiment will be described with reference to FIGS. 2 to 5. Then, an example of a functional configuration of the imaging device 1 will be described with reference to FIG. 6, and an example of a functional configuration of the information processing device 3 will be described with reference to FIG. 7.

2-1. External Configuration of Imaging Device

Figure 2:
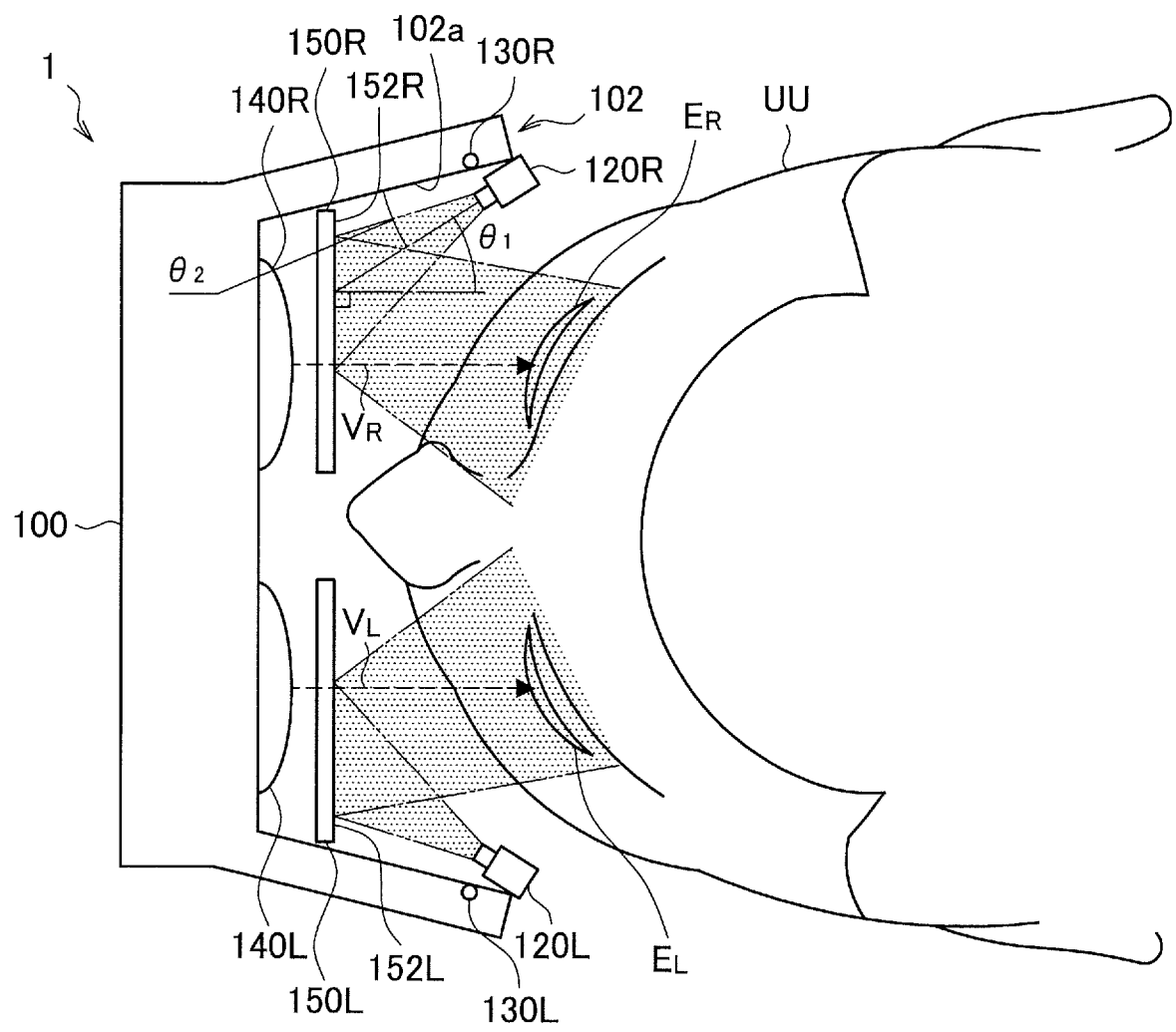
FIG. 2 is a plan view of an imaging device 1 according to this embodiment mounted on a user UU.
Figure 3:
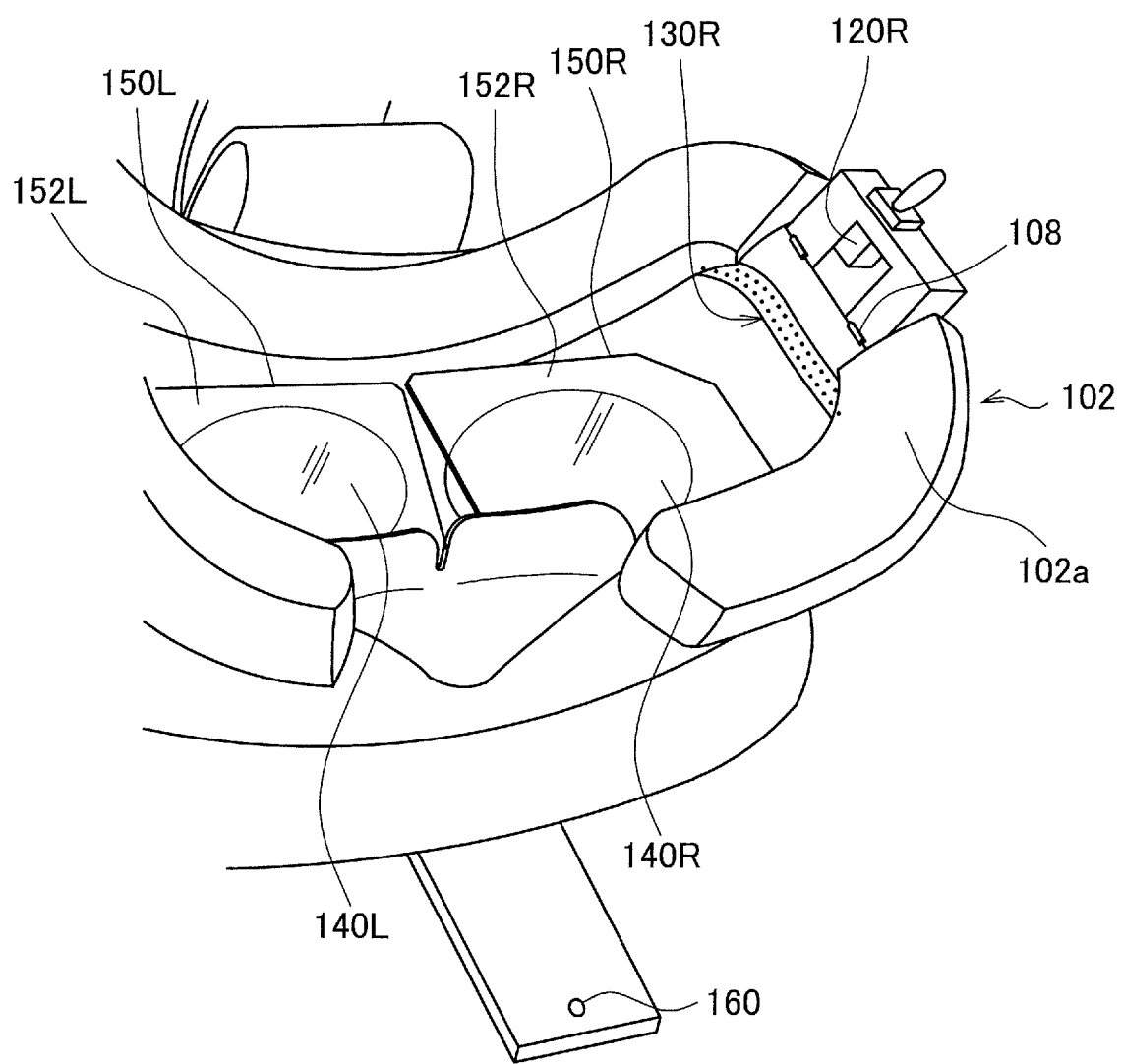
FIG. 3 is a perspective view illustrating a part of the imaging device 1 seen from inside.
Figure 4:
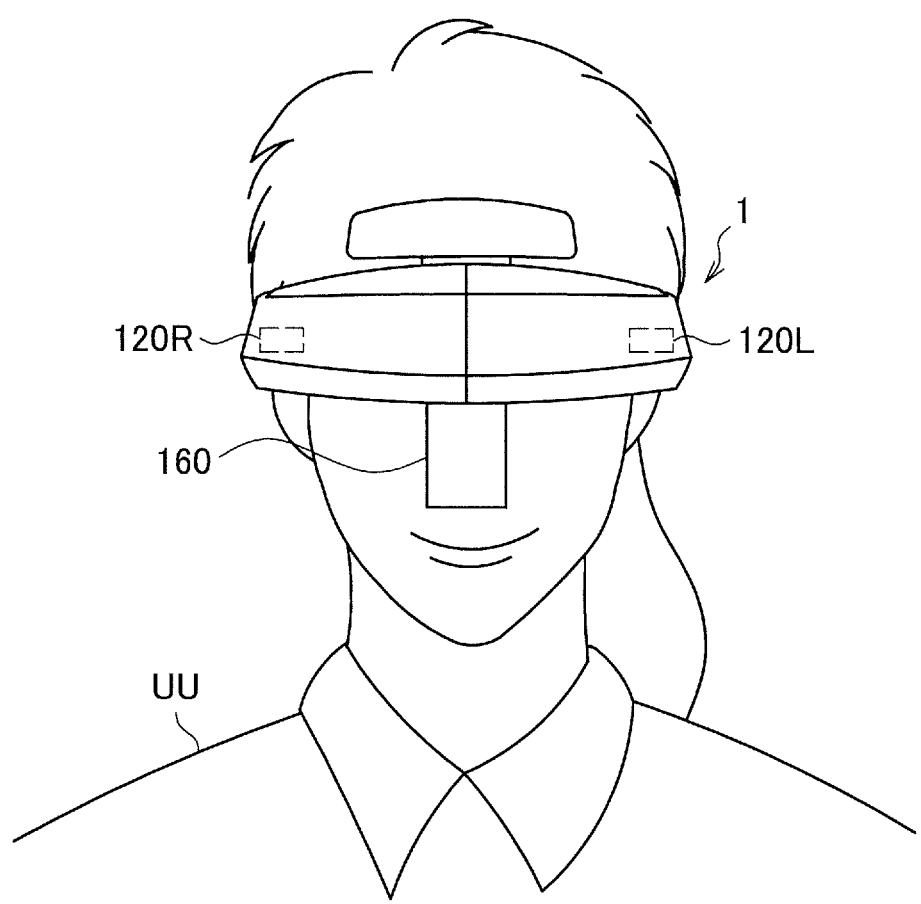
FIG. 4 is a front view of the imaging device 1 mounted on the user UU.
Figure 5:
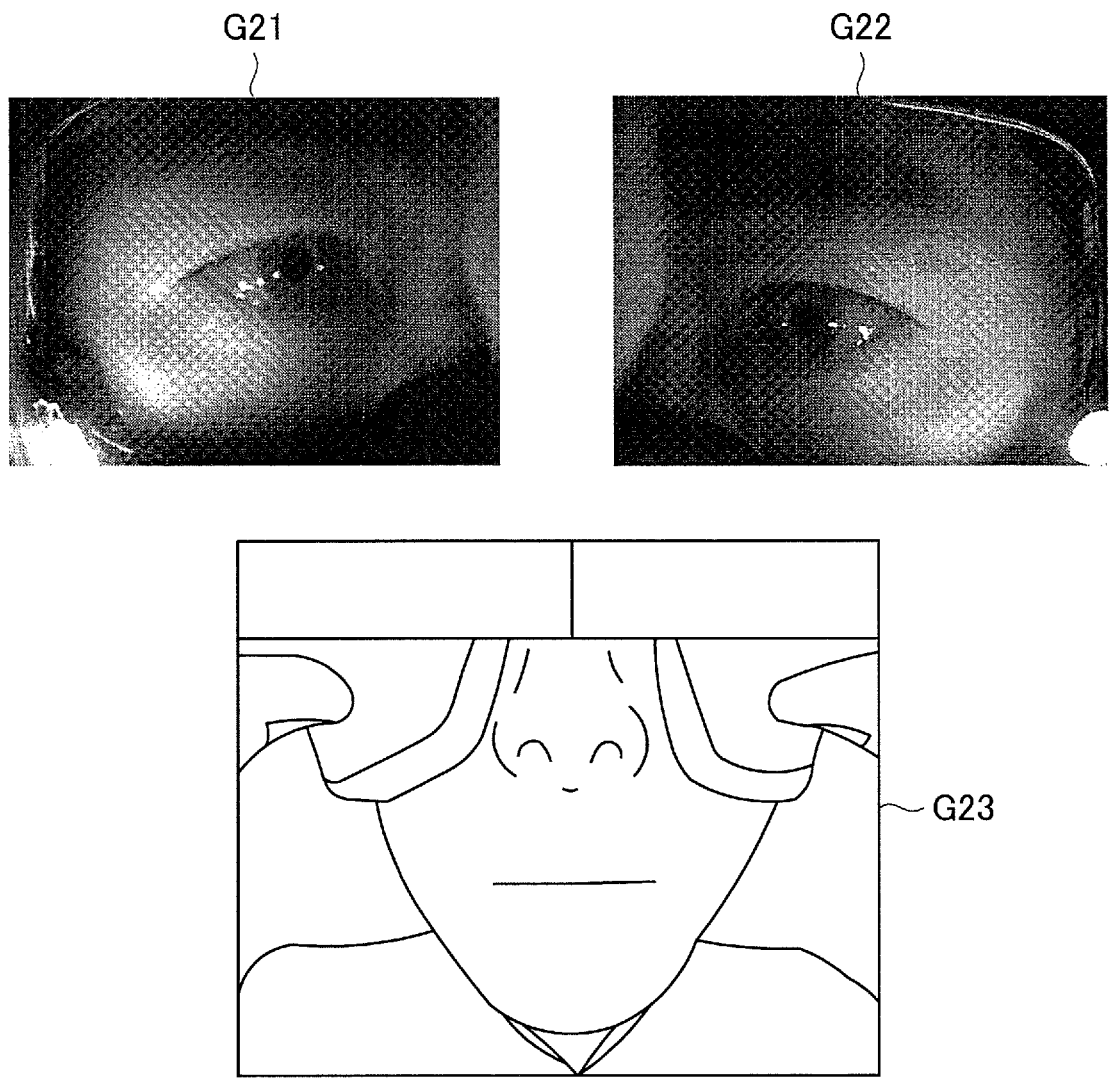
FIG. 5 is an explanatory diagram illustrating an example of images imaged by the imaging device 1.

FIG. 2 is a plan view of the imaging device 1 mounted on a user UU. Further, FIG. 3 is a perspective view illustrating a part of the imaging device 1 seen from inside. Further, FIG. 4 is a front view of the imaging device 1 mounted on the user UU. Further, FIG. 5 is an explanatory diagram illustrating an example of images imaged by the imaging device 1.

As illustrated in FIGS. 2 to 4, the imaging device 1 includes a housing 100 (support structure) mountable on a head of the user UU, an infrared-light imaging unit 120 (first imaging unit), a light source 130, a display unit 140, an optical filter 150, and a visible-light imaging unit 160 (second imaging unit). Further, the housing 100 according to the present embodiment is a non-transmissive housing, and, as illustrated in FIG. 4, a part of the face of the user UU (e.g. a part of and around eyes of the user UU) is shielded.

The infrared-light imaging unit 120 (first imaging unit) responds to at least infrared light (an example of predetermined light having a predetermined wavelength band) and acquires an image (first image) including at least a part of the face of the user UU on the basis of the infrared light. As illustrated in FIGS. 2 and 4, the infrared-light imaging unit 120 may include an infrared-light imaging unit 120R. for a right eye $E_R$ and an infrared-light imaging unit 120L for a left eye $E_L$. Note that, although the wavelength band to which the infrared-light imaging unit 120 responds is not particularly limited, infrared light may have, for example, a wavelength band of equal to or more than 0.75 µm and may be light invisible to the user in the following description.

As illustrated in FIGS. 2 and 3, the infrared-light imaging unit 120 may be provided on an inner surface 102a of an abutting portion 102 (a surface abutting against the face of the user UU) in the housing 100, the abutting portion 102 abutting against the face of the user UU when the housing 100 is mounted on the head of the user. For example, the infrared-light imaging unit 120 may be provided on at least one of a left inner surface (left side of 102a) of the abutting portion 102 or a right inner surface (right side of 102a) thereof. With this configuration, it is possible to further increase a distance from the infrared-light imaging unit 120 to a subject as compared with a case where the infrared-light imaging unit 120 is provided on an upper side or lower side of the inner surface 102a, and therefore it is possible to further increase an image-capturing range of the infrared-light imaging unit 120. Further, as illustrated in FIG. 2, it is desirable that the infrared-light imaging unit 120 be provided at an end of the abutting portion 102. With this configuration, it is possible to further increase the distance from the infrared-light imaging unit 120 to the subject, and therefore it is possible to further increase the image-capturing range of the infrared-light imaging unit 120.

Further, as illustrated in FIG. 2, the infrared-light imaging unit 120 may be placed so that an angle $θ_1$ (first angle) between an imaging direction of the infrared-light imaging unit 120 and a normal line of a reflection surface 152 of the optical filter 150 is larger than 0°. The larger the angle $θ_1$ is, the wider the image-capturing range of the infrared-light imaging unit 120 can be. Further, as illustrated in FIG. 2, the infrared-light imaging unit 120 may be placed so that an angle $θ_2$ (second angle) between the imaging direction of the infrared-light imaging unit 120 and the inner surface 102a of the abutting portion 102 is larger than 0°. The larger the angle $θ_2$ is, the wider the image-capturing range of the infrared-light imaging unit 120 can be. Further, as illustrated in FIG. 3, the imaging device 1 may include an adjusting mechanism 108 (e.g. hinge) that can adjust the imaging direction of the infrared-light imaging unit 120, and the infrared-light imaging unit 120 may be connected to the housing 100 via the adjusting mechanism 108. For example, the imaging direction of the infrared-light imaging unit 120 may be adjustable toward inside of the housing 100 by using the adjusting mechanism 108. With this configuration, it is possible to easily adjust an imaging range of the infrared-light imaging unit 120.

The light source 130 emits infrared light (an example of predetermined light having a predetermined wavelength band). The light source 130 may be achieved to include, for example, an infrared LED or the like. In the example illustrated in FIG. 2, the light source 130 includes a light source 130R provided on a right side to the front of the device and a light source 130L provided on the right side to the front of the device. With this configuration, even in a case where the housing 100 is a non-transmissive housing, the inside of the housing 100 can be illuminated with infrared light. Further, because light emitted from the light source 130 is infrared light invisible to the user, the user UU does not perceive brightness of illumination that illuminates the face and does not feel glare.

Although the number of light sources 130 and a position at which the light source 130 is provided are not limited to the examples illustrated in FIGS. 2 and 3, it is desirable that the light source 130 be provided in a blind spot of the infrared-light imaging unit 120 (outside the image-capturing range of the infrared-light imaging unit 120). This is because, in a case where the light source 130 is included in an image acquired by the infrared-light imaging unit 120, luminance may be saturated in, for example, a part of the image. Note that the light source 130 may or may not have directionality.

The display unit 140 displays, with visible light, for example, an image provided from the information processing device 3 described above with reference to FIG. 1. As illustrated in FIGS. 2 and 3, the display unit 140 includes, for example, a display unit 1408 for the right eye $E_R$ and a display unit 140L for the left eye $E_L$.

The optical filter 150 includes the reflection surface 152 that reflects infrared light (an example of predetermined light having a predetermined wavelength band) and allows visible light to pass. For example, the optical filter 150 may be a reflective infrared-light cut filter.

As illustrated in FIG. 2, the optical filter 150 may include an optical filter 1508 that is provided to allow visible light $V_R$ emitted by the display unit 140R to pass and an optical fitter 150L that is provided to allow visible light $V_L$ emitted by the display unit 140L to pass. For example, as illustrated in FIG. 2, the optical filter 150R and the optical filter 150L may be positioned in a field of view of the user UU, and the user UU can visually recognize the display unit 140R and the display unit 140L via the optical filter 150R and the optical filter 150L. With this configuration, for example, the user UU observes an image displayed on the display unit 140R with the right eye $E_R$ and an image displayed on the display unit 140L with the right eye $E_L$ and can therefore achieve three-dimensional observation.

Further, the optical filter 150 and the infrared-light imaging unit 120 may be provided so that infrared light reflected by the reflection surface 152 of the optical filter 150 is incident on the infrared-light imaging unit 120, and the infrared-light imaging unit 120 may acquire an image on the basis of the infrared light reflected by the reflection surface 152.

With this configuration, even in a case where the housing 100 is small, it is possible to increase the distance from the infrared-light imaging unit 120 to the subject, and it is possible to capture an image of the face of the user at a suitable angle of view and also restrain an increase in size of the device.

Further, the optical filter 150 and the infrared-light imaging unit 120 may be provided so that the infrared-light imaging unit 120 acquires an eye image including the eyes of the user UU. In the example illustrated in FIG. 2, the infrared-light imaging unit 120R acquires an eye image (first image) including the right eye $E_R$ of the user UU, and the infrared-light imaging unit 120L acquires an eye image (first image) including the left eye $E_L$ of the user UU.

Because eyes of human beings are important to grasp expression, it is possible to achieve smoother communication by providing the eye image acquired by the infrared-light imaging unit 120 to, for example, a user who faces the user UU in the VR space.

An eye image G21 illustrated in FIG. 5 is an example of the image acquired by the infrared-light imaging unit 120R, and an eye image G22 is an example of the image acquired by the infrared-light imaging unit 120L. As illustrated in FIG. 5, the infrared-light imaging unit 120 may be provided so that the eye image G21 and the eye image G22 include eyebrows of the user UU. With this configuration, for example, the user who faces the user UU in the VR space can grasp expression of the user UU in more detail.

Further, the above-mentioned light source 130R and light source 130L may be provided so that the light source 130R illuminates the left eye $E_R$ of the face of the user UU and the light source 130L illuminates the right eye $E_L$ of the face of the user UU.

For example, infrared light emitted by the light source 130 may directly illuminate the face (may be reflected by the face) of the user UU or may be reflected by the housing 100 and indirectly illuminate the face (be reflected by the face) of the user UU. Note that, in a case where infrared light is reflected by the housing 100, irradiation luminance with respect to the face of the user UU may be homogenized by providing, on a reflection unit of the housing 100, a member having higher diffusibility of light than that of other parts of the housing. The infrared light emitted by the light source 130 may be directly or indirectly reflected by the face of the user, be further reflected by the reflection surface 152 of the optical filter 150, and be incident on the infrared-light imaging unit 120.

Note that, although FIG. 2 illustrates an example where the infrared light reflected by the reflection surface 152 is directly incident on the infrared-light imaging unit 120, the present embodiment is not limited to such an example, and the infrared light reflected by the reflection surface 152 may be further reflected and be indirectly incident on the infrared-light imaging unit 120.

The visible-light imaging unit 160 (second imaging unit) responds to visible light and acquires a mouth image (second image) including a mouth of the user UU. As illustrated in, for example, FIGS. 3 and 4, the visible-light imaging unit 160 may be provided in a lower portion to the front of the device so as to image a part of and around the mouth of the user.

A mouth image G23 illustrated in FIG. 5 is an example of the image acquired by the visible-light imaging unit 160. Because mouths of human beings are important to grasp expression, it is possible to achieve smoother communication by providing the mouth image acquired by the visible-light imaging unit 160 to, for example, a user who faces the user UU in the VR space. Note that the mouth image is not limited to a visible-light image and may be an image acquired on the basis of light having another wavelength band.

2-2. Functional Configuration of Imaging Device

Figure 6:
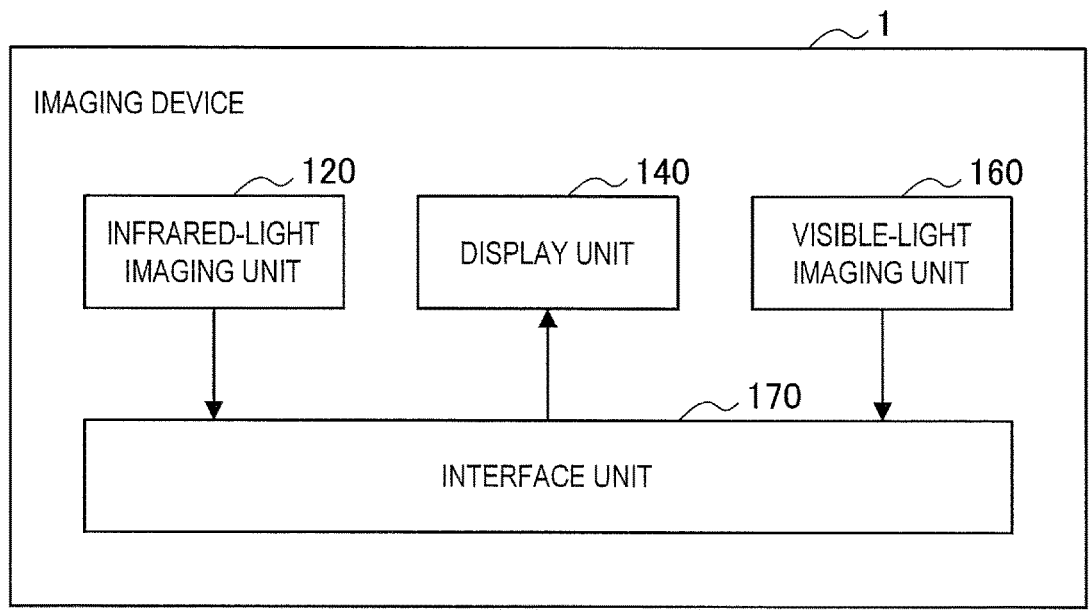
FIG. 6 is a block diagram illustrating an example of a functional configuration of the imaging device 1 according to this embodiment.

Hereinabove, an example of the external configuration of the imaging device 1 according to the present embodiment has been described with reference to FIGS. 2 to 5. Next, an example of a functional configuration of the imaging device 1 will be described with reference to FIG. 6. FIG. 6 is a block diagram illustrating an example of the functional configuration of the imaging device 1 according to the present embodiment.

As illustrated in FIG. 6, the imaging device 1 includes the infrared-light imaging unit 120, the display unit 140, the visible-light imaging unit 160, and an interface unit 170. Note that the infrared-light imaging unit 120, the display unit 140, and the visible-light imaging unit 160 illustrated in FIG. 6 have been described with reference to FIGS. 2 to 4, and therefore description thereof will be provided while being appropriately omitted.

The interface unit 170 is an interface for input/output. For example, the interface unit 170 performs input/output of information with respect to the information processing device 3 illustrated in FIG. 1. The interface unit 170 may be an interface for wired connection or may be an interface for wireless connection.

For example, the eye image acquired by the infrared-light imaging unit 120 and the mouth image acquired by the visible-light imaging unit 160 are output from the interface unit 170 to the information processing device 3. Further, an image input from the information processing device 3 to the interface unit 170 is provided to the display unit 140 and is displayed thereon.

2-3. Functional Configuration of Information Processing Device

Figure 7:
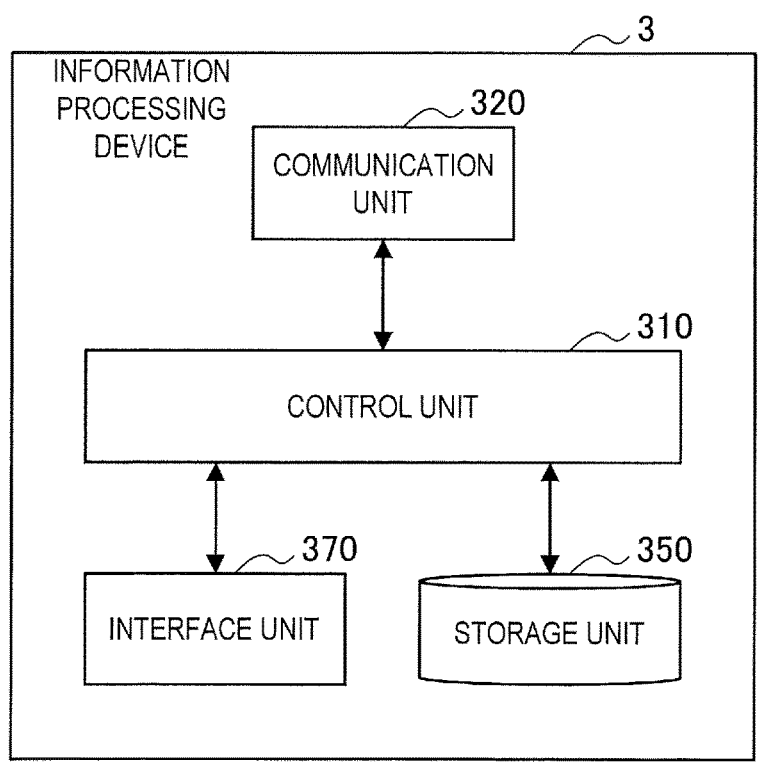
FIG. 7 is a block diagram illustrating an example of a functional configuration of an information processing device 3 according to this embodiment.

Hereinabove, an example of the functional configuration of the imaging device 1 according to the present embodiment has been described. Next, an example of a functional configuration of the information processing device 3 according to the present embodiment will be described with reference to FIG. 7. FIG. 7 is a block diagram illustrating an example of the functional configuration of the information processing device 3 according to the present embodiment.

As illustrated in FIG. 7, the information processing device 3 includes a control unit 310, a communication unit 320, a storage unit 350, and an interface unit 370.

The control unit 310 controls each configuration of the information processing device 3. Further, the control unit 310 combines an eye image and a mouth image of the user provided from the imaging device 1 with a 3D model of the user prepared in advance and reproduces a 3D model of the user who is not wearing the imaging device 1. An example of combination processing performed by the control unit 310 will be described below with reference to FIGS. 8 to 12.

The communication unit 320 communicates information with another device. The communication unit 320 may be connected to, for example, the communication network 5 described above with reference to FIG. 1 and communicate information with the server 7.

The storage unit 350 stores programs and parameters with which each configuration of the information processing device 3 functions. Further, the storage unit 350 may store information regarding the 3D model of the user prepared in advance.

The interface unit 370 is an interface for input/output. For example, the interface unit 370 performs input/output of information with respect to the imaging device 1. The interface unit 370 may be an interface for wired connection or may be an interface for wireless connection. Note that, although the communication unit 320 and the interface unit 370 are illustrated as different functions in FIG. 7, the communication unit 320 and the interface unit 370 may be the same.

3. Operation

Figure 8:
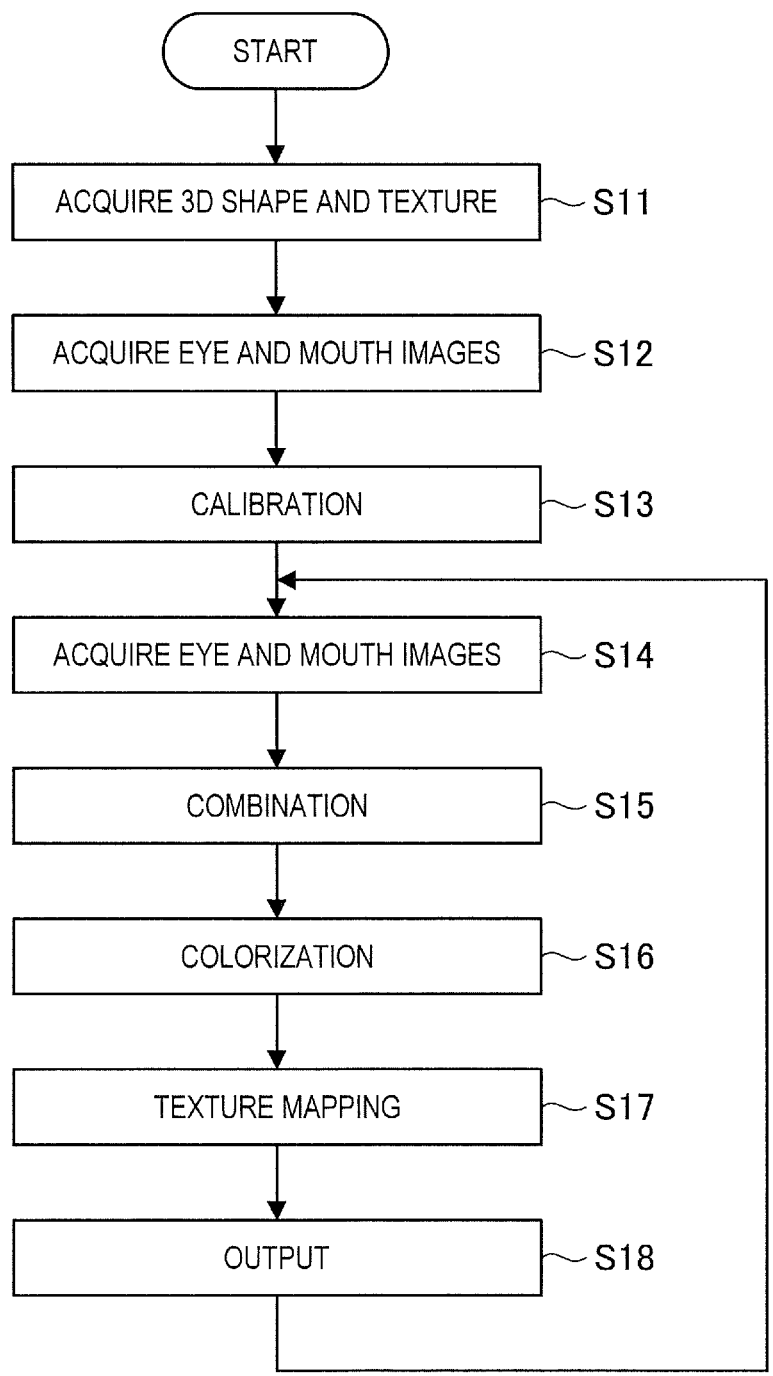
FIG. 8 is a flowchart showing an example of operation of a VR system 9 according to this embodiment.

Hereinabove, an example of the configuration of the present embodiment has been described. Next, an example of operation of the VR system 9 according to the present embodiment will be described with reference to FIGS. 8 to 12. FIG. 8 is a flowchart showing an example of the operation of the VR system 9 according to this embodiment.

First, as illustrated in FIG. 8, a 3D shape and texture of a user are acquired in advance (S11). Note that, hereinafter, any one or both of information regarding the 3D shape and information regarding the texture will be referred to as information regarding a 3D model in some cases. The information regarding the 3D model may be acquired by, for example, a 3D scanner or the like and may be stored on the storage unit 350 of the information processing device 3.

Figure 9:
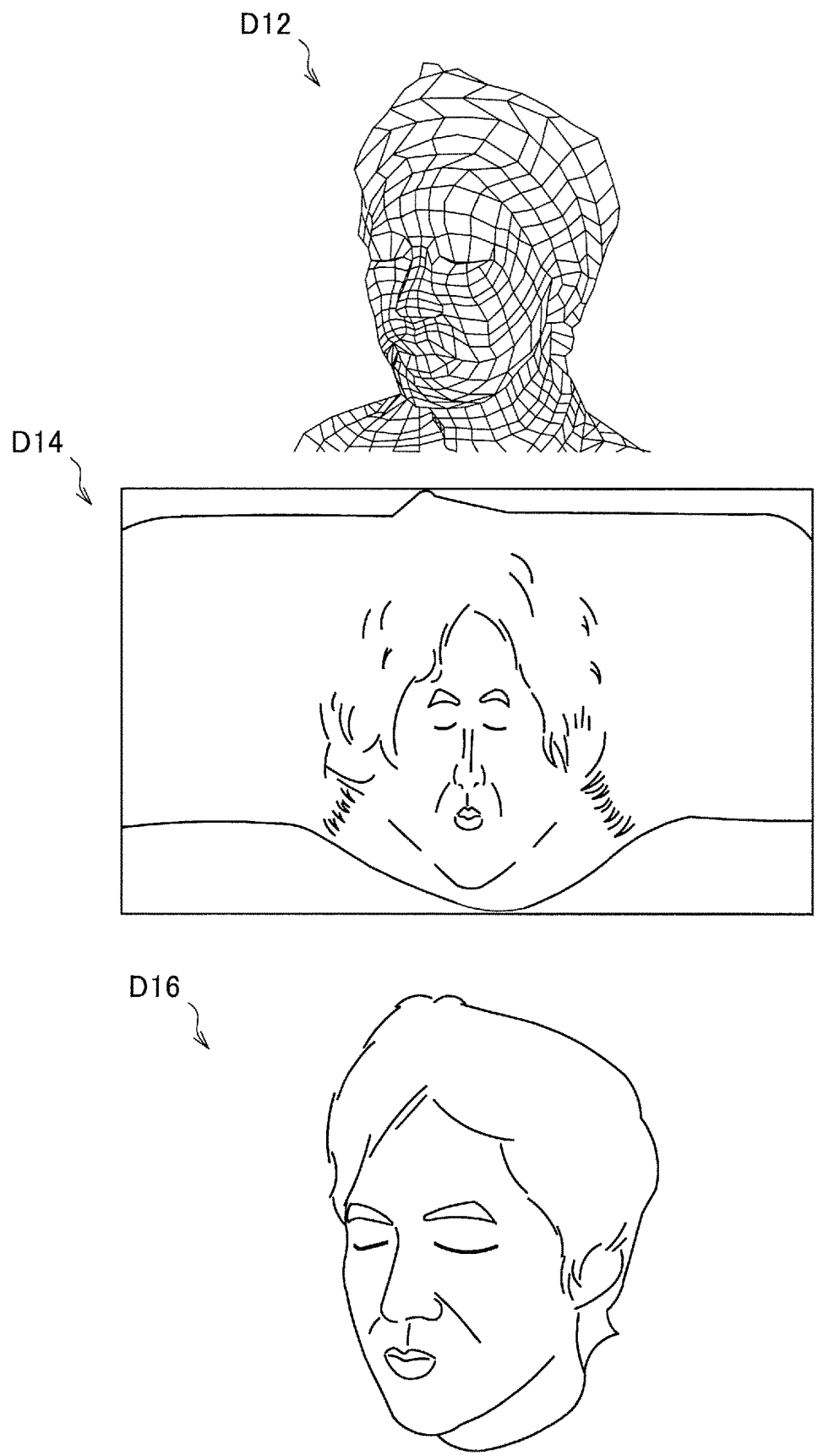
FIG. 9 is an explanatory diagram illustrating an example of a 3D shape and texture.

FIG. 9 is an explanatory diagram illustrating an example of the 3D shape and the texture acquired in Step S11. In Step S11, a 3D shape D12 and texture D14 can be acquired as illustrated in FIG. 9. Note that the texture D14 may be acquired in a data format in which the texture D14 is placed so as to be mapped on the 3D shape D12. For example, in the example of FIG. 9, in a case where the texture D14 is mapped on the 3D shape D12, a 3D model D16 is obtained.

Then, as illustrated in FIG. 8, the eye image and the mouth image described above with reference to FIG. 5 are acquired by the imaging device 1 mounted on the head of the user (S12).

Then, the 3D model acquired in Step S11 and the eve image and the mouth image acquired in Step S12 are calibrated (S13). Note that such calibration may be performed by using the information processing device 3 or may be performed by using another device.

FIG. 10 is an explanatory diagram for describing an example of the calibration in Step S13. An image G31 illustrated in FIG. 10 is an image obtained by rendering the 3D model D16 illustrated in FIG. 9 from a point of sight (hereinafter, referred to as "rendering point of sight") at which a part of and around an eve of the user is included in the image G31. An image G32 illustrated in FIG. 10 is an image obtained by projecting the eye image acquired in Step S12 onto the 3D shape D12 illustrated in FIG. 12 at a certain projection position and a certain projection posture, performing the above-mentioned rendering, and then perforating rendering. Further, an image G33 illustrated in FIG. 10 is an image obtained by superimposing the image G31 on the image G32.

The user performs calibration for adjusting parameters regarding the above-mentioned projection position and projection posture so that a difference between the image G31 and the image G32 is reduced while checking, for example, the image G33.

Figure 11:
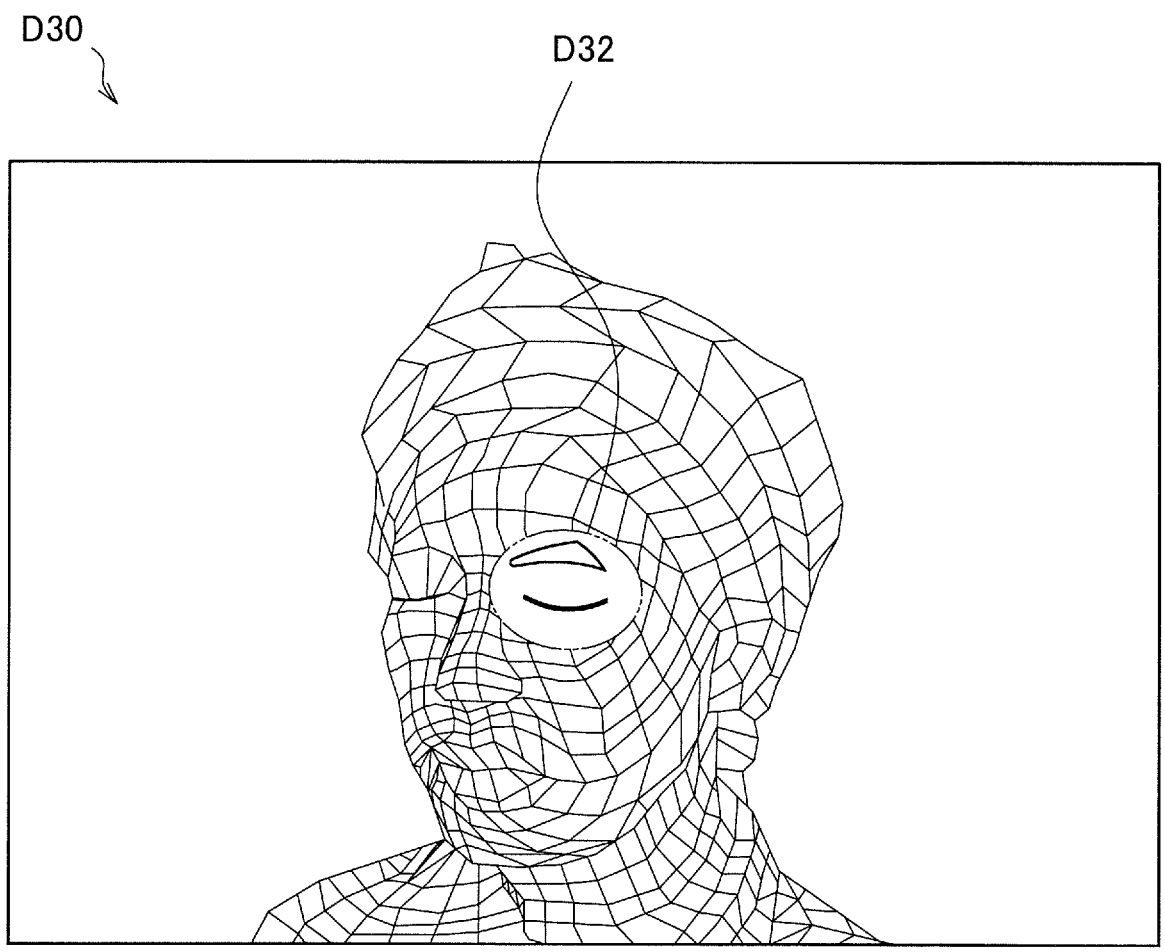
FIG. 11 is an explanatory diagram illustrating an example of projection of an eye image obtained after calibration is completed.

FIG. 11 is an explanatory diagram illustrating an example of projection of the eve image obtained after calibration is completed. A 3D model D30 illustrated in FIG. 11 is a 3D model obtained by projecting the eye image onto an area D32 of the 3D shape D12 at the projection position and the projection posture obtained after the above-mentioned calibration is completed. Note that, although FIG. 11 illustrates an example where only an eve image regarding a left eye is projected, an eye image regarding a right eye and a mouth image can also be projected onto appropriate areas by performing similar calibration on each image.

After calibration is completed, information regarding information regarding an area of texture (hereinafter, referred to as area to be combined) corresponding to a projection area in the 3D model (the area D32 in FIG. 11) may be stored on the storage unit 350.

Note that, although an example where the user performs calibration has been described in the above description, for example, calibration may be automatically performed by matching processing based on image recognition or the like.

Description will be continued by referring back to FIG. 8. The following Steps S14 to S18 are processing that is regularly or sequentially repeated.

In Step S14, an eye image and a mouth image are acquired by the infrared-light imaging unit 120 and the visible-light imaging unit 160, respectively, of the imaging device 1 mounted on the head of the user and are provided to the information processing device 3. Then, the control unit 310 of the information processing device 3 combines the texture obtained in Step S11 with the eye image and the mouth image obtained in Step S14 (S15).

For example, the control unit 310 may combine the eye image and the mouth image with the areas to be combined in the texture obtained by the calibration in Step S13. In the combined image, an area other than combination areas corresponding to the eye image and the mouth image may be similar to the texture obtained in Step S11.

Then, the control unit 310 performs colorization in which the combined texture obtained in Step S15 is colored (S16). With this configuration, the combined texture obtained by combining the eye image (not a color image) obtained on the basis of infrared light is changed to a color image. Note that, in a case where the combined texture includes color information, colorization may be performed after gray scaling is performed.

Note that colorization can be performed by various methods. For example, colorization may be performed by using Deep Convolutional Neural Network (DCNN) obtained by causing a combination of a grayscale face image and a color face image to be learned as teaming data in advance. Note that the grayscale face image may be an image based on infrared light. Further, a combination of grayscale texture such as the texture D14 illustrated in FIG. 9 and color texture may be used as learning data instead of the combination of the grayscale face image and the color face image.

Then, the control unit 310 maps the texture colored in Step S16 on the 3D shape acquired in Step S11, thereby obtaining a 3D model (S17). The 3D model obtained in Step S17 is output to the server 7 described above with reference to FIG. 1 (S18). As described above with reference to FIG. 1, an image based on the 3D model is provided to, for example, another user in the VR space, and therefore smooth communication with another user can be achieved.

Figure 12:
FIG. 12 is an explanatory diagram illustrating examples of a 3D model to be output.

FIG. 12 is an explanatory diagram illustrating examples of the 3D model to be output in Step S18. With the series of processing (S14 to S18) described above, it is possible to reproduce a 3D model of the user who is not wearing the imaging device 1 while reflecting current expression of the user as in 3D models D71 to D73 illustrated in FIG. 12. Further, it is also possible to observe the 3D model from various angles.

4. Modification Examples

Hereinabove, an embodiment of the present disclosure has been described. Hereinafter, some modification examples of the embodiment of the present disclosure will be described. Note that each modification example described below may be applied to the embodiment of the present disclosure alone or may be applied to the embodiment of the present disclosure in combination. Further, each modification example may be applied instead of the configuration described above in the embodiment of the present disclosure or may be additionally applied to the configuration described above in the embodiment of the present disclosure.

4-1. Modification Example 1

In the above-mentioned embodiment, there has been described an example where the information processing in Steps S15 to S17 described above with reference to FIG. 8 is performed by the control unit 310 included in the information processing device 3. However, the present technology is not limited to such an example.

For example, the imaging device 1 may include a control unit and may perform the information processing in Steps S15 to S17. Further, the server 7 described above with reference to FIG. 1 may perform the information processing in Steps S15 to S17, and, in such a case, the imaging device 1 may include a communication unit and may be connected to the communication network 5, and an eye image and a mouth image may be transmitted from the imaging device 1 to the server 7.

4-2. Modification Example 2

Further, in the above-mentioned embodiment, there has been described an example where the present technology is applied to the application in which remote users virtually perform face-to-face communication in the VR space. However, there are various applications to which the present technology is applicable, and the present technology is not limited to such an example.

For example, according to the present technology, it is possible to acquire an eve image and a mouth image showing current expression of the user, and therefore the present technology is also applicable to, for example, an application in which display and processing based on expression of the user are performed. Further, according to the present technology, it is possible to acquire an eye image, and therefore it is possible to estimate a line of sight on the basis of the eye image, and the present technology is also applicable to an application in which display and processing based on a line of sight of the user are performed.

Further, by projecting a reproduced 3D model of the user who is not wearing the imaging device 1 onto a 3D-shape screen that a remote robot includes, face-to-face communication with another user may be performed via the robot that exists in a real space.

4-3. Modification Example 3

Further, in the above-mentioned embodiment, there has been described an example where the projection position and the projection posture are adjusted in the calibration in Step S13 illustrated in FIG. 8. However, the present technology is not limited to such an example. For example, projection luminance may be adjusted so that a difference in luminance between texture and an eye image and a mouth image is reduced. Note that the projection luminance may be adjusted by the user or may be automatically adjusted. In a case where the projection luminance is automatically adjusted, for example, after the projection position and the projection posture are determined and the area to be combined is determined, a luminance correction parameter may be specified so that a total value of differences between luminance values in boundaries between the texture and the eye image and the mouth image is minimized.

5. Hardware Configuration Example

Figure 13:
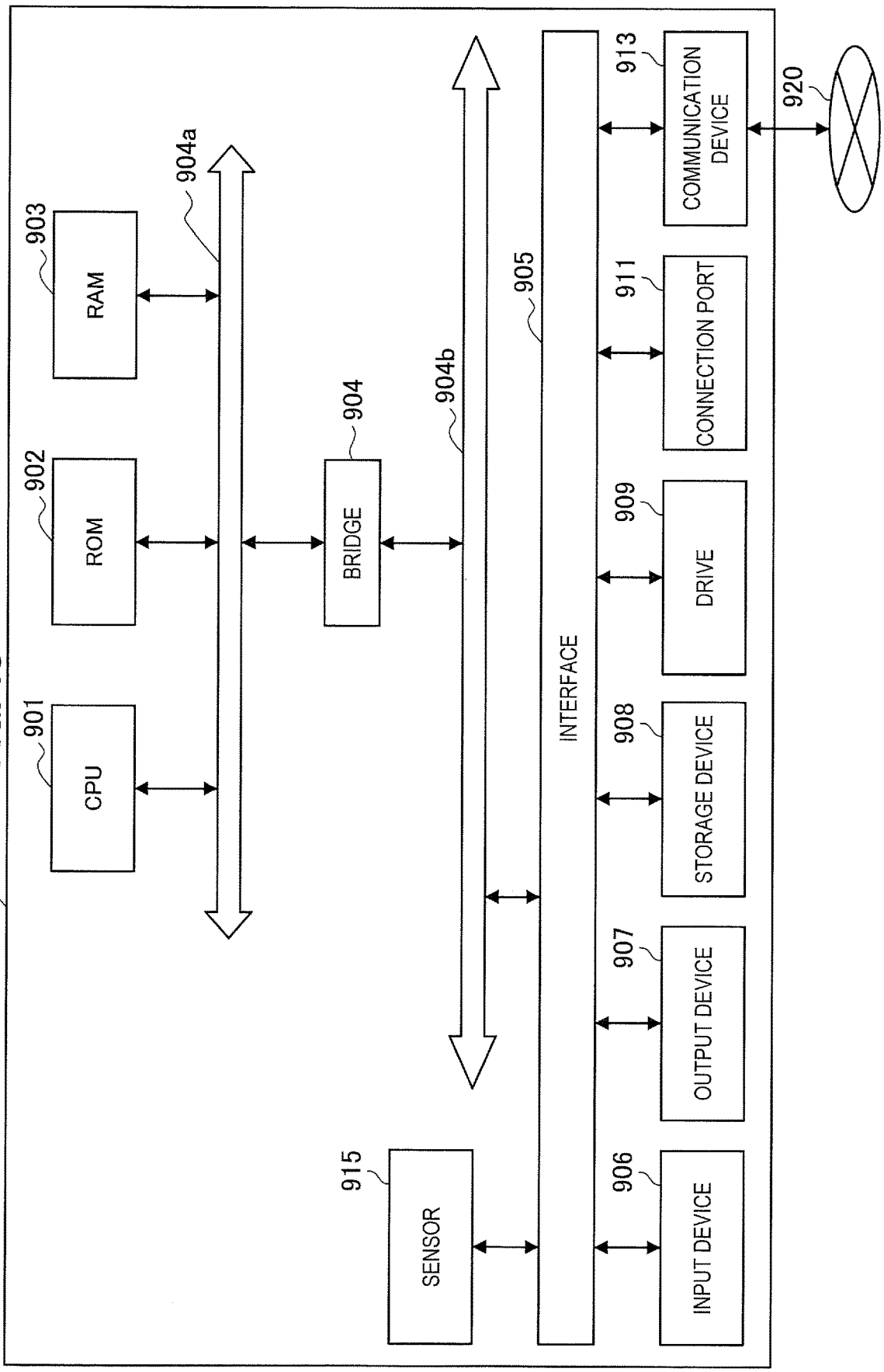
FIG. 13 is an explanatory diagram illustrating an example of a hardware configuration.

The embodiment of the present disclosure has been described hitherto. Finally, a hardware configuration of an information processing apparatus according to the present embodiment of the present disclosure will be described with reference to FIG. 13. FIG. 13 is a block diagram illustrating an example of the hardware configuration of the information processing apparatus according to the present embodiment of the present disclosure. Meanwhile, an information processing apparatus 900 illustrated in FIG. 13 may realize the information processing apparatus 3 and the server 7 illustrated in FIG. 1 and FIG. 7, for example. Information processing by the information processing apparatus 3 and the server 7 according to the present embodiment is realized according to cooperation between software and hardware described below.

As illustrated in FIG. 13, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control unit 310, and the like, for example.

The CPU 901, the ROM 902, and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904, and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The output device 907 is formed by a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form the storage unit 350, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information regarding the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication apparatuses according to a predetermined protocol such as, for example, TCP/IP. The communication device 913 may form the communication unit 320, for example.

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900, and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may he implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium. In addition, the above-described computer program may be distributed through, for example, a network without using a recording medium.

6. Conclusion

As described above, according to the embodiment of the present disclosure, it is possible to capture an image of a face of a user at a suitable angle of view and also restrain an increase in size of a device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-mentioned embodiment, an example where the imaging device 1 is a non-transmissive HMD has been described. However, the present technology is not limited to such an example. For example, the imaging device 1 may be, for example, a transmissive HMD used in an augmented reality (AR) system. In such a case, the optical filter 150 may allow both visible light from the outside world and visible light emitted by a transmissive display unit to pass. Note that a support structure of a general transmissive HMD includes a frame portion extending along sides of a face of a user as in glasses and visors. In a case where the embodiment of the present technology is applied to a transmissive HMD, the infrared-light imaging unit may be provided on an inner surface (surfaces facing the sides of the face) of the frame portion (corresponding to temples of glasses). Further, the imaging device 1 may be a head-mounted device that does not include a display unit (e.g. line-of-sight measurement device or the like), and, in such a case, the optical filter 150 may allow visible light from the outside world to pass.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An imaging device including:

a support structure configured to be mountable on a head of a user;

an optical filter having a reflection surface that reflects predetermined light having a predetermined wavelength band and allows visible light to pass; and at least one first imaging unit configured to acquire a first image including at least a part of a face of the user on the basis of the predetermined light reflected by the reflection surface.

(2)

The imaging device according to (1), in which the support structure includes an abutting portion that abuts against the face of the user when the support structure is mounted on the head of the user, and the first imaging unit is provided on an inner surface of the abutting portion.

(3)

The imaging device according to (2), in which the first imaging unit is provided on at least one of a left inner surface or a right inner surface of the abutting portion.

(4)

The imaging device according to (2) or 3, in which the first imaging unit is provided at an end of the abutting portion.

(5)

The imaging device according to any one of (2) to (4), in which the first imaging unit is placed so that a first angle between an imaging direction and a normal line of the reflection surface is larger than 0°.

(6)

The imaging device according to (5), in which the first imaging unit is placed so that a second angle between the imaging direction and the inner surface of the abutting portion is larger than 0°.

(7)

The imaging device according to (5) or (6), further including an adjusting mechanism capable of adjusting the imaging direction.

(8)

The imaging device according to (1), in which the first imaging unit is provided so that the first image includes an eye of the user.

(9)

The imaging device according to (8), in which the first imaging unit is provided so that the first image further includes an eyebrow of the user.

(10)

The imaging device according to (1), in which the support structure includes a frame portion extending along a side of the face of the user when the support structure is mounted on the head of the user, and the first imaging unit is provided on an inner surface of the frame portion facing the user.

(11)

The imaging device according to any one of (1) to (10), further including a light source configured to emit the predetermined light.

(12)

The imaging device according to (11), in which the predetermined light emitted by the light source is directly or indirectly reflected by the face of the user, is further reflected by the optical filter, and is directly or indirectly incident on the first imaging unit.

(13)

The imaging device according to any one of (1) to (12), in which the optical filter is positioned in a field of view of the user when the support structure is mounted on the head of the user.

(14)

The imaging device according to (13), further including a display unit configured to perform display with the visible light, in which the optical filter allows the visible light emitted by the display unit to pass.

(15)

The imaging device according to any one of (1) to (14), in which the predetermined light is infrared light.

(16)

The imaging device according to any one of (1) to (15), further including a second imaging unit configured to acquire a second image including a mouth of the user.

REFERENCE SIGNS LIST 1 imaging device
3 information processing device
5 communication network
7 server
9 system
100 housing
120 infrared-light imaging unit 130 light source
140 display unit
150 optical filter
160 visible-light imaging unit
170 interface unit
310 control unit
320 communication unit
350 storage unit
370 interface unit

The invention claimed is:

1. An imaging device comprising:
   housing configured to be mountable on a head of a user;
   a light source configured to emit infrared light;
   an optical filter having a reflection surface that reflects the infrared light and allows visible light to pass;
   and
   at least one first imaging unit configured to acquire a first image including at least a part of a face of the user on a basis of the infrared light reflected by the reflection surface,
   wherein the housing has a first part and a second part that has higher diffusibility of the infrared light than that of the first part, and wherein the infrared light is reflected by the second part and emitted to the face of the user.

2. The imaging device according to claim 1,
   wherein the housing includes an abutting portion that abuts against the face of the user when the support structure housing is mounted on the head of the user, and
   the first imaging unit is provided on an inner surface of the abutting portion.

3. The imaging device according to claim 2,
   wherein the first imaging unit is provided on at least one of a left inner surface or a right inner surface of the abutting portion.

4. The imaging device according to claim 2,
   wherein the first imaging unit is provided at an end of the abutting portion.

5. The imaging device according to claim 2,
   wherein the first imaging unit is placed so that a first angle between an imaging direction and a normal line of the reflection surface is larger than 0°.

6. The imaging device according to claim 5,
   wherein the first imaging unit is placed so that a second angle between the imaging direction and the inner surface of the abutting portion is larger than 0°.

7. The imaging device according to claim 5, further comprising
   an adjusting mechanism capable of adjusting the imaging direction.

8. The imaging device according to claim 1,
   wherein the first imaging unit is provided so that the first image includes an eye of the user.

9. The imaging device according to claim 8,
   wherein the first imaging unit is provided so that the first image further includes an eyebrow of the user.

10. The imaging device according to claim 1,
    wherein the housing includes a frame portion extending along a side of the face of the user when the housing is mounted on the head of the user, and
    the first imaging unit is provided on an inner surface of the frame portion facing the user.

11. The imaging device according to claim 1,
    wherein the infrared light emitted by the light source is directly or indirectly reflected by the face of the user, is further reflected by the optical filter, and is directly or indirectly incident on the first imaging unit.

12. The imaging device according to claim 1,
    wherein the optical filter is positioned in a field of view of the user when the housing is mounted on the head of the user.

13. The imaging device according to claim 12, further comprising
    a display unit configured to perform display with the visible light, wherein the optical filter allows the visible light emitted by the display unit to pass.

14. The imaging device according to claim 1, further comprising
    a second imaging unit configured to acquire a second image including a mouth of the user.

15. The imaging device according to claim 1, wherein
    the second part is configured to homogenize irradiation luminance of the infrared light with respect to the face of the user.

* * * * *